Patented June 13, 1944

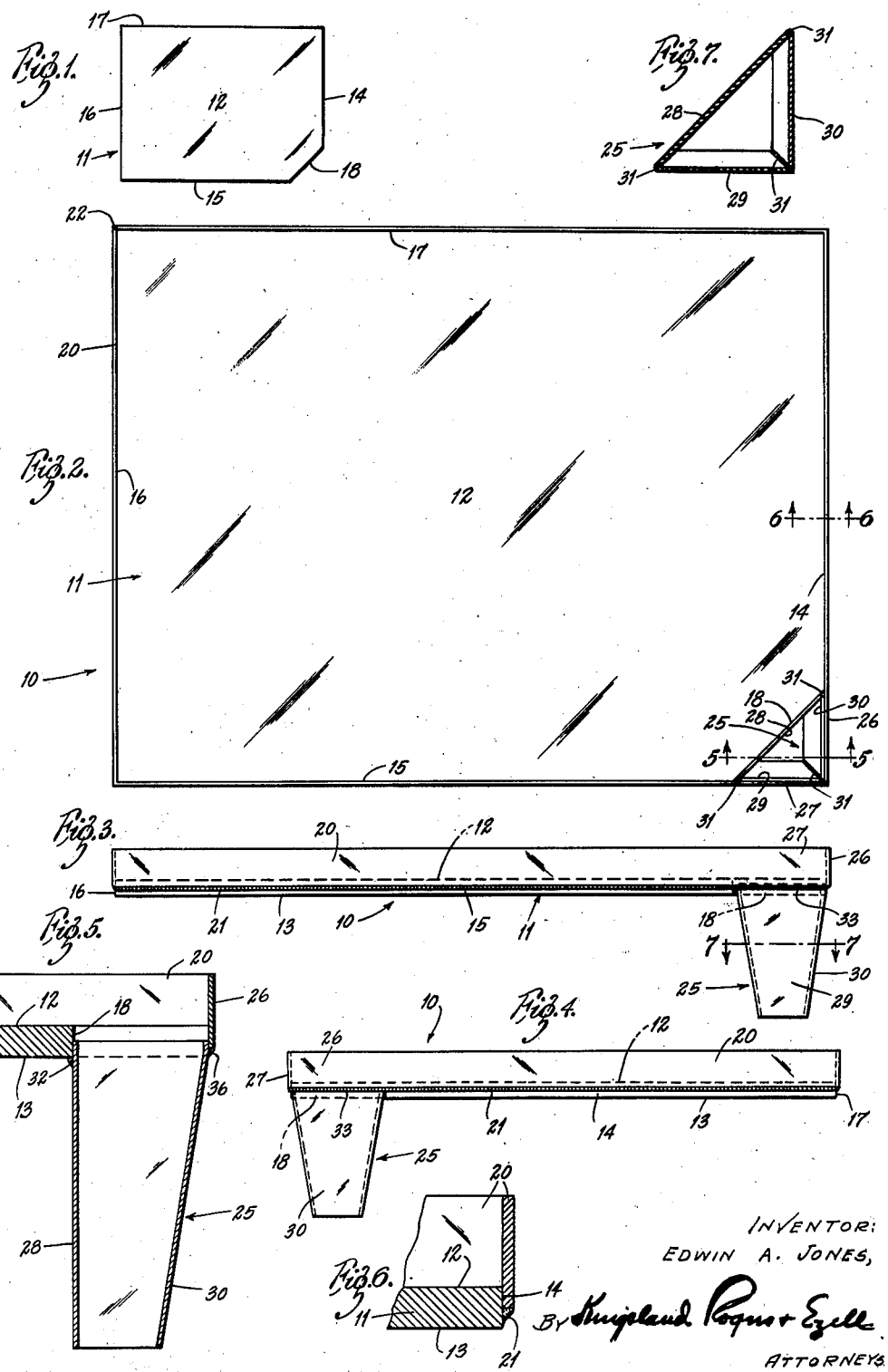

2,351,130

UNITED STATES PATENT OFFICE 2,351,130

GRIDDLE PLATE

Edwin A. Jones, Webster Groves, Mo., assignor to Majestic Manufacturing Company, St. Louis, Mo., a corporation of Missouri Application July 21, 1941, Serial No. 403,314

2 Claims. (Cl. 99—425)

The present invention relates generally to griddles and more particularly to griddle plates and to drip chutes employed with griddle plates.

Another object is to provide a novel cast griddle plate, which has an upper face which is dead flat over the full area thereof.

Another object is to provide a novel griddle plate of cast iron which incorporates all of the features of flatness, smoothness and polish of a new steel plate and which includes a vertical side member extending around the full periphery thereof.

Another object is to provide a novel drip chute for griddle plates.

Another object is to provide a cast griddle plate which incorporates all of the structural advantages of a new steel plate and which retains all the advantages of a cast iron including even distribution of heat applied thereto.

Other objects are to provide a novel cast griddle plate capable of being made by a method which may be readily adapted to existing equipment, which is simple and efficient in its individual steps, and which achieves a griddle plate of improved superior construction.

Other objects and advantages are apparent from the following description taken with the accompanying drawing in which:

Fig. 1 is a reduced plan view of a cast iron plate;

Fig. 2 is a plan view of a griddle plate constructed in accordance with the teachings of the present novel method of making griddle plates and incorporating a preferred embodiment of the present novel drip chute;

Fig. 3 is a side view of the griddle construction shown in Fig. 2;

Fig. 4 is a side view on a diminished scale of the griddle construction shown in Fig. 2 at 90° clockwise rotation to Fig. 3;

Fig. 5 is an enlarged section on the line 5—5 of Fig. 2;

Fig. 6 is an enlarged section on the line 6—6 of Fig. 2; and

Fig. 7 is an enlarged section on the line 7—7 of Fig. 3.

Referring to the drawing, there is shown a griddle plate constructed by the present novel method and including the present novel drip chute. In order to better understand the present method, the griddle plate assemblage shown in the drawing is described in detail first.

In the drawing, 10 indicates generally a griddle plate assemblage constructed by the novel method evolved by the applicant. The griddle plate assemblage 10 includes a base plate 11 having a highly polished cooking surface 12, an unfinished undersurface 13, square right angularly disposed edges 14, 15, 16, and 17, and a diagonally disposed square edge 18 between the edges 14 and 15 effected by cutting off a corner of the plate 11. The plate 11 as shown is of cast iron and is perfectly flat on the cooking surface 12. A continuous steel strip 20 is secured by exterior welding 21 to the edges 14, 15, 16, and 17 of the plate 11 at right angles thereto. In regard to the edge 18, the steel strip 20 completes the two sides of a right isosceles triangle relative thereto. The strip 20 has its ends welded together at any convenient place, such as the corner 22.

A drip chute 25 is secured in the space defined by the edge 18 and portions 26 and 27 of the strip 20. The chute 25 comprises a vertical wall 28 (Fig. 7) and sloping walls 29 and 30, each wall being a separate plate. The walls are secured together by welding 31. The wall 28 is secured to the edge 18 by suitable welding 32 (Fig. 5); the wall 29 is secured to the portion 27 of the strip 20 by suitable welding 33; and the wall 30 is secured to the portion 26 of the strip 20 by suitable welding 36. It is to be understood, of course, that the chute 25 leads to a suitable receiving tray or other grease removing means.

With the foregoing in mind, the present novel method of making the griddle plate assemblage 10 is readily understood. A cast iron plate of suitable thickness and configuration is ground on one side until a dead flat surface is achieved, after which the surface is polished. The edges of the plate are ground or machined square and true. The plate is then copper, nickel, and chrome plated and buffed on the flat surface to a mirror finish.

A strip of steel finished similarly to the surface of the plate is welded to the edges of the plate in a manner to extend upwardly to provide walls, the weld fillet being exterior and adjacent the lower face of the plate as shown. After the welding operation, any discoloring is removed by light buffing.

The result of the aforesaid method of making a griddle plate is to provide one of cast iron which is perfectly flat and yet which is surrounded by a defining wall which prevents loss of grease, foodstuff, and the like, and which provides a stop for preparation of food. Heretofore, cast iron griddle plates have either had mere depressions in the center area of the plate, or have included integral walls which render true flat finishing commercially impossible and which have a curvature adjacent the same, defeating the purpose of a defining wall. Steel griddle plates have been unsatisfactory in view of the fact that none has been devised which will not curve or warp under the heat required for cooking.

For purposes of illustration a cast iron construction is shown and described, but it is contemplated that other suitable cast metals are within the scope of the invention.

It is apparent, therefore, that the applicant has provided a novel method of making a griddle plate and a novel griddle plate construction. It is also manifest that he has provided a novel drip chute which finds application not only with the present construction but with other constructions.

It is to be understood that the foregoing specification and the accompanying drawing have been given by way of illustration and example and not for purposes of limitation, the invention being limited only by the claims which follow:

1. A griddle plate construction comprising a cast iron, relatively warp-free plate having one surface machined and polished to its edges, and a rim member originally separate from the plate but integrally and permanently united therewith, said rim extending around a major part of the entire edge of the plate, said rim member extending upwardly above said polished surface of the plate with the inner edge of the rim member at a sharp angle relative to said surface, said rim member extending outwardly beyond a portion of said griddle plate to provide an opening between the edge of the griddle and the extending parts of the rim member, and a chute secured within the opening to receive and control flow of material passing off the griddle plate.

2. A griddle plate construction comprising a cast iron, relatively warp-free plate having one surface machined and polished to its edges, a rim member originally separate from the plate but integrally and permanently united therewith about substantially the entire edge of the plate, said rim member extending upwardly above said polished surface of the plate with the inner edge of the rim member at a sharp angle relative to said surface, one corner of the plate being cut away, the rim portions extending on said corner to meet as if the plate had not been cut away, to provide, with the edge of the plate at said corner, a pocket, and a casing having three walls adapted to be secured to the two portions of the rim and the plate forming the walls of said pocket.

EDWIN A. JONES.